(12) United States Patent
Reiffel

(10) Patent No.: US 7,998,242 B2
(45) Date of Patent: *Aug. 16, 2011

(54) METHOD AND APPARATUS FOR CARRYING OUT A METALLURGICAL PROCESS

(75) Inventor: Leonard Reiffel, Chicago, IL (US)

(73) Assignee: Iron Mount Corporation, Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/720,493

(22) Filed: Mar. 9, 2010

(65) Prior Publication Data

US 2011/0030842 A1  Feb. 10, 2011

Related U.S. Application Data

(63) Continuation of application No. 11/151,014, filed on Jun. 12, 2005, now Pat. No. 7,674,315.

(60) Provisional application No. 60/578,956, filed on Jun. 12, 2004, provisional application No. 60/604,364, filed on Aug. 24, 2004, provisional application No. 60/628,599, filed on Nov. 17, 2004, provisional application No. 60/633,614, filed on Dec. 6, 2004.

(51) Int. Cl.
*C21B 3/02* (2006.01)
*C21B 5/00* (2006.01)
*C22B 7/02* (2006.01)

(52) U.S. Cl. ............................ 75/484; 75/526; 75/961

(58) Field of Classification Search ................... 75/484, 75/526, 961

See application file for complete search history.

(56) References Cited

U.S. PATENT DOCUMENTS 3,369,681 A * 2/1968 Casson .................. 414/802
7,674,315 B2 * 3/2010 Reiffel .................... 75/484
2010/0122607 A1   5/2010 Reiffel

OTHER PUBLICATIONS

"The Making of Steel". American Iron and Steel Institute. 1954. pp. 25-27.*

* cited by examiner

*Primary Examiner* — George Wyszomierski
*Assistant Examiner* — Tima M McGuthry-Banks
(74) *Attorney, Agent, or Firm* — Garvey, Smith, Nehrbass & North, L.L.C.; Seth M. Nehrbass; Vanessa M. D'Souza

(57) ABSTRACT

A metallurgical process involves providing an ingredient enclosure and placing a plurality of granules of a first material in the ingredient enclosure. The first material contains a first ingredient in a metallurgical process. A metallurgical process furnace having a chamber in which ingredients for the metallurgical process are added is provided and the ingredient enclosure and the first material are added to the chamber. The chamber is heated after the addition of the ingredient enclosure and the first material to the chamber, although it may also be heated prior to such addition. In one form, the granules comprise mill scale and the metallurgical process furnace is a blast furnace.

17 Claims, 11 Drawing Sheets

US 7,998,242 B2

METHOD AND APPARATUS FOR CARRYING OUT A METALLURGICAL PROCESS

BACKGROUND

This is a continuation of U.S. patent application Ser. No. 11/151,014, filed 12 Jun. 2005 (issued as U.S. Pat. No. 7,674, 315), which is a nonprovisional patent application of U.S. Provisional Patent Application No. 60/578,956, filed 12 Jun. 2004, U.S. Provisional Patent Application No. 60/604,364, filed 24 Aug. 2004, U.S. Provisional Patent Application No. 60/628,599, filed 17 Nov. 2004, and U.S. Provisional Patent Application No. 60/633,614, filed 6 Dec. 2004. This Patent Application concerns concepts found in my earlier U.S. Provisional Application Nos. 60/578,956 (filed 12 Jun. 2004), 60/604,364 (filed 24 Aug. 2004), 60/628,599 (filed 17 Nov. 2004), 60/633,614 (filed 6 Dec. 2004), which are all incorporated herein by reference. Among other things, this application describes methods, apparatus and techniques for re-introducing iron-rich mill scale back into the basic iron and/or steel process stream whereby valuable economic and environmental benefits may be obtained. Mill scales (essentially iron oxides) are a generally little-exploited but highly available byproduct of standard production procedures. In this application, there are provided more details on a system and method for introducing mill scale (or other materials, including other waste materials) into a conventional Blast Furnace (BF) or other metallurgical process, such as making or refining a metal or making and compounding alloys). The described systems and methods are also suited to the utilization of wastes containing combustible matter as sources of metallurgical process heat and useful chemical elements.

The processing of iron and steel generates huge amounts of waste material consisting of small particles of iron oxide and other so-called "fines" and scrap—the former being typified by oxide-rich sand-like grains and brittle pieces of both larger and smaller size. Many techniques have been applied to the difficult challenge of economically recycling such materials. Generally these recovery and recycling methods require crushing the waste to relatively small size, mixing the ferrous material with various chemicals that may include fluxes and carbon-containing reducing agents such as ground coke, adding water and binding compounds such as cement, pelletizing the mixture, aging and drying the so-called green pellets, and, in the particular process known as hot briquetting, the exposing the pellets to high temperatures to convert the oxides. A major reason for such procedures is the high velocity gas flows that the material encounters during down-stream recycling operations (such as those carried out in blast furnaces and other apparatus for smelting and steel-making) produce extremely serious dust problems if the fine material were not transformed into the hard and mechanically resistant pellets or similar forms.

A key characteristic of mill scale is that it is a largely comprised of small particles "fines" rich in iron oxide. If simply dropped into the furnace these "fines" are often entrained by the high velocity air blast permeating the blast furnace and quickly ejected from the system. A portion of those fines that are not ejected can seriously clog and impede the passage of blast gases upward through the furnace thus reducing its efficiency. These problems have led to the various very expensive and energy-consuming processes now used to re-cycle limited amounts of mill scale. Briquetting, for example, compacts the mill scale plus binders into roughly biscuit-sized agglomerates that are relatively well suited to the blast furnace environment But besides being inefficient and expensive compared to the system and methods disclosed herein, such processing for recovery of the iron in mill scale is typically done only with relatively clean scale. Oily and grease-laden mill scales, which have accumulated in large quantities over many decades throughout the world, are not well-suited to such methods because binders do not work well with such materials.

Due to these technical and cost issues, hundreds of millions of tons of mill scale have accumulated in the US alone. The mere cost of placing mill scale in landfills or "dumps" can currently reach seventeen to thirty-five dollars per ton. Other metallurgical waste fines present similar problems. The disclosed method eliminates disposal costs by providing an economical method for recycling fines that does not use binders or sintering processes, avoids dust dispersal, avoids pollution from vaporized hydrocarbons in oily fines, and can use carbon-containing fines in combination with the metallurgical fines to contribute process energy (BTUs) and components for desirable chemical reactions such as oxide reduction.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION

Figure 1:
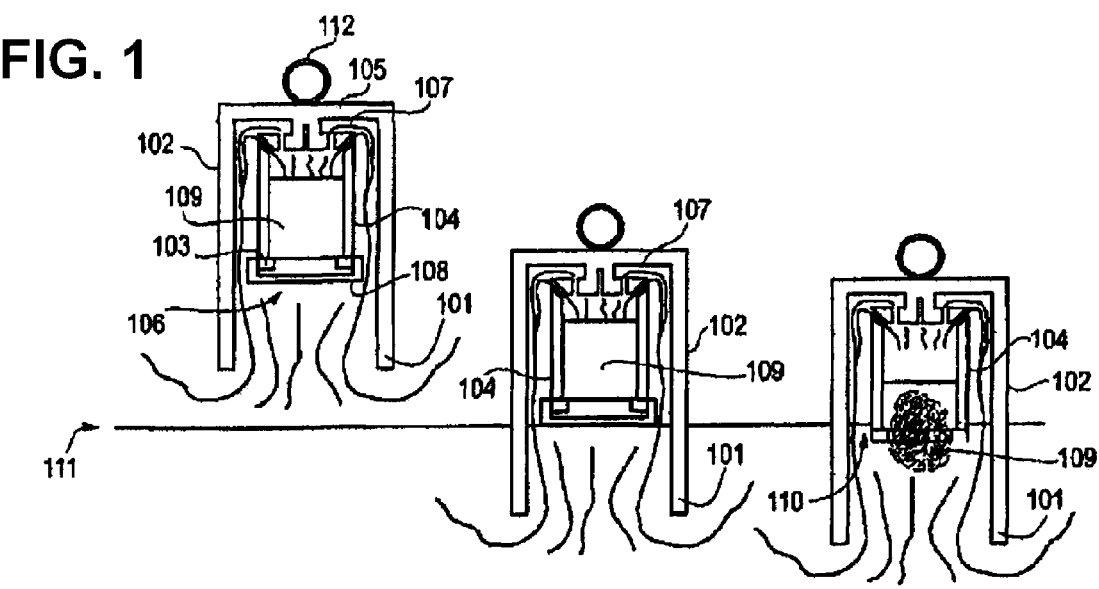
FIG. 1 shows one form of the invention that uses a reusable container and a liquid seal from liquid metal to inject materials below the surface of the liquid in a metallurgical process.

The concepts disclosed here are also believed to be ideally suited to but not limited to the recycling of iron fines alone. In contrast to previous methods of recycling, the technology described herein can be applicable to either clean or oily/grease-laden fines as well as combinations thereof. It is believed the disclosed bulk encapsulation costs promise to be low; the preparation process is believed to be simple, fast, and scaleable. The principles disclosed are believed to be economically adaptable to a wide variety of enclosures or containers, such as capsules, sizes (e.g. diameters 6 inches to several feet accommodating individual loads from under 100 pounds to several tons per capsule) and different shapes including but not limited to quasi-spheres, "sandbags", elongated cylinders, and sausages. The different shapes can even be tied or strung together like a strand of pearls or a bunch of bananas. A blast furnace operator, for example, is thus provided with desirable flexibility in the use of the method and means to control the distribution of capsules containing mill scale within the blast furnace charge and melt.

Two fundamental forms of enclosures are disclosed herein-consumable and reuseable.

Consumable Containers

The consumable container encloses the iron fines (and other accompanying cargo materials, such as coke fines, desired to be added in a metallurgical process, such as in a blast furnace). The consumable container is added to the rest of the materials in the charge of the blast furnace and slowly descends (as other materials in the charge melt or are consumed). The temperature of the furnace increases with depth and the container finally descends to a region at which it disassembles or melts releasing the iron fines or other material so deep or actually into liquid metal where it will not be blown about by the blast in the blast furnace. The consumable container can be designed to melt, rupture, or otherwise fail before it has reached the level of the liquid level, but after it has spent enough time exposed to the high temperatures of the blast furnace so that the iron fines and/or other materials have time to soften and bind somewhat together so that fines are not blown about by the blast.

Re-Useable Containers

The other form involves the use of a reusable container that encloses the iron fines (and/or other materials) where the reusable container is lowered into a hot liquid metal and the material inside the container is injected below the surface of the hot liquid metal. The use of the reusable containers will be largely discussed first (with reference to FIGS. 1-9, whereas the use of the consumable containers will largely be discussed later with respect to FIG. 10 and greater. However, the discussion is somewhat intermixed (along with some of the Figures being intermixed).

Salient physical features and mechanisms of operation of the present invention are shown in the accompanying figures. In subsequent portions of this document, suitable materials, some relevant cost parameters of the encapsulation components, and certain physical and process variables are discussed.

Disclosed herein, are novel methodology and apparatus for recycling of mill scale and other fines (and other waste materials) via containerization designs that possess, among other features, controlled properties of thermal disassembly, heat transfer control, venting characteristics, fusible closures, subsurface injection into process, and use of liquid metal seals. The invention can employ some or all the following steps and elements:

Adjust size spectrum of fines if necessary;

Mix other chemicals, materials, or waste materials such as carbon-containing substances (such as coal, coke, polymers or elastomers) with fines;

Form a container volume;

Place fines and accompanying chemicals (and/or materials) in a container volume and install closures;

Fabricate the container to include fasteners that confine the content within the container walls;

Use fastener materials that thermally fail at temperatures lower than the failure temperature of the container walls;

Use fastener technology such as welds or crimps that thermally fail at temperatures equal to or greater than the failure temperature of the container wall materials;

Use fastener technology such as welds or crimps that thermally fail at temperatures about equal to the failure temperature of the container wall materials;

Fabricate the container to include at least one region (which may also be a closure) that opens or melts ("fuses") when the region reaches a pre-determined temperature regime;

Arrange the container to have at least one gas permeable region opening to the external environment;

Arrange high temperature woven fabric to prevent dust from escaping through gas-permeable regions;

Arrange high temperature non-woven felts to prevent dust from escaping through gas-permeable regions;

Arrange to convey the loaded container to the top region of the blast furnace;

Arrange to introduce the container into the blast furnace;

Arrange to vary the lateral distribution of containers entering the furnace;

Arrange to control the vertical distribution of containers as they embed in the settling blast furnace burden;

Arrange the container to have heat-conducting channels opening to the external environment and which may be gas-permeable;

Pre-treat the containerized fines with heat and gases if necessary (e.g. dry);

Position the container to use waste heat utilization for drying and pre-treatment;

Position the container to avoid dust dispersal and/or content re-oxidation by arranging for it to be near to, or partially or totally submerged in, pre-existing hot materials at the time of thermally actuated opening of the closure ("sub-surface injection");

Arrange an open-bottom injector bell within which the container is positioned at time of opening;

Arrange for the bottom of the injector bell with the container inside to extend into hot liquid metal thus affecting a seal against material escaping to the external environment as the container empties its contents through the thermally actuated opening as shown in FIG. 1;

Arrange for a portion of the injector bell submerges below the liquid metal to be preheated in order to prevent the liquid metal in contact with the injector bell from cooling due to the introduction of a heat sink;

Employ a moving bed furnace for pre-treating a layer of fines (plus chemicals as may be required for reduction) before containerization by exposure to heat under a blanket of high temperature dust filter fabric and then load the material into the container;

Employ boundary layer flow effects, such as egg-crate-like flow shields and aerodynamic vanes adjacent to the fabric dust filter, to minimize effects of burner blast in the above described furnace treatment step; and/or Equip the container with multiple nozzle drains (or other openings) with different flow characteristics and/or thermal opening temperatures for control of exit melting.

Other features and aspects of the invention will be evident in the Figures and the comments included in the specification.

Reusable Container Systems

Referring to FIG. 1, there is shown a simplified apparatus and method for recycling mill scale. A thermally actuated opening/closure 106 is applied to an open ladle or similar melt container 104. In one form, opening/closure 106 is comprises a solid metal barrier or door 108 attached to container 104 with a fusible link 103 that is designed to melt after exposure to very high temperatures for a period of time.

In one form of use, the melt container 104 is used in conjunction with a reusable injection bell 102. Melt container 104 can be suspended within injection bell 102 using a coupling 105 to couple melt container 104 to injection bell 102. This coupling together of the melt container 104 and injection bell 102 allows the trapping of gases to occur in the injection bell 102 as the temperature rises close to injection level below the level of the liquid metal, such as melt 111. This can assist injection, for example, if gas-permeable openings 107 are included in the melt container 104 above the thermally actuated opening/closure 106. Additional gas can be added at this stage via water-cooled piping. A descending member (not shown) can also apply additional downward and stabilizing force to the Injection Bell as it enters the melt 111.

The injection bell may be equipped with a local source of heat, such as heater 101, positioned near its lower perimeter. This heat source 10 may be electrically driven such as a silicon carbide rod assembly and protected if necessary from direct contact with the melt 111 by refractory material. Gas-driven heat sources may also be used. The purpose of this local heating is to minimize freeze-out of metal from melt 111 onto the lower regions of the injector bell and to compensate for local cooling effects of the material being injected.

In use, the injection material 109 (such as metal fines and/or other materials (such as waste products, plastics or carbon containing materials)) is added to the melt container 104. A door 108 made of suitable material (such as metal) is placed can be placed on the bottom of the melt container 104 and sealed with a fusible link 103 (such as a molten metal or weld) to seal the bottom of the melt container to form the thermally actuated opening/closure 106 through which the injection materials 109 will be introduced into the liquid metal, such as melt 111.

The melt container 104 is coupled to the injection bell 102 by coupling 105 and lowered toward the melt 111, such as in a torpedo car (see 202 in FIG. 2) or hot melt car, such as by lowering with a chain (not shown) attached to a support coupled to injection bell 102, such as ring 112. As injection bell 102 is lowered, the heat from the melt can cause injection material 109 to heat up and dry out somewhat by expelling gases through gas-permeable openings 107. As the injection bell 102 is lowered into melt 111, these gases build up inside injection bell 102 and increase the gas pressure as the injection bell 102 is lowered into melt 111. The melt container 104 also begins to enter melt 111 and forms a liquid metal seal 110 that prevents injection material from flowing into the air when opening/closure 106 opens. As container 104 is lowered, the heat continues to build until it reaches the critical temperature for actuating thermally actuated opening/closure 106 and causing opening/closure 106 to open. The built up gas pressure inside injection bell 102 flows through gas-permeable openings 107 and aids in expelling the injection material 109 out of melt container 104 and deeper into melt 111 by creating a pressure against injection material 109 and pushing it into melt 111.

Figure 2:
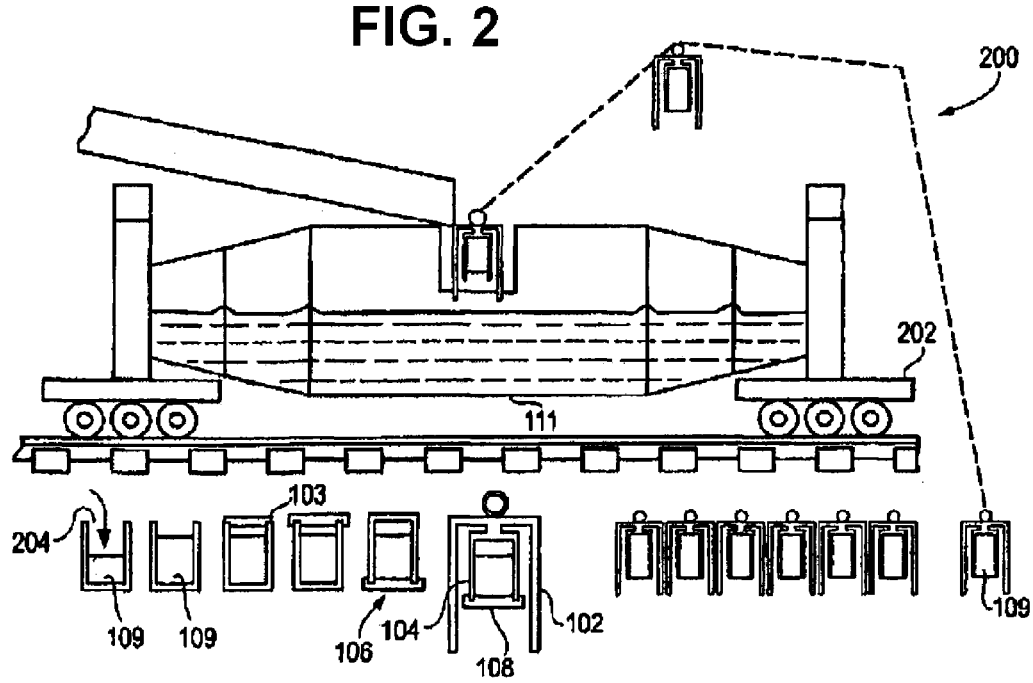
FIG. 2 shows one source of the liquid metal for the form of the invention of FIG. 1.
Figure 4:
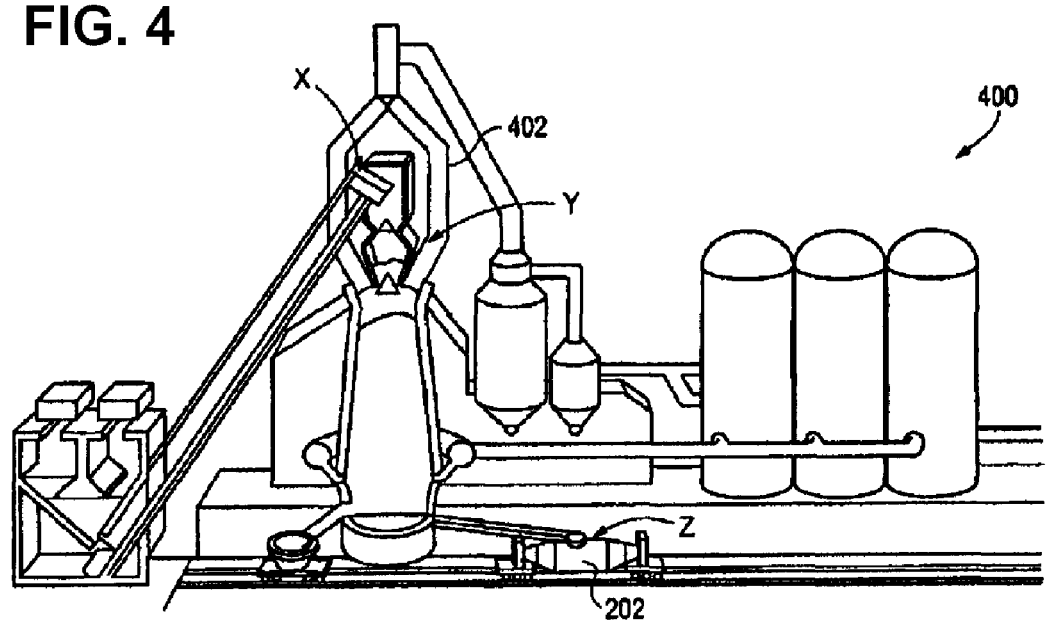
FIG. 4 shows a blast furnace that is used in one form of the invention.

FIG. 2 depicts some the features of a batch system 200 that can be used for injecting fines into the molten contents of a torpedo car 202 carrying liquid iron (or melt 111) tapped from a blast furnace (see FIG. 4). Similar procedures can be used with open ladles (not shown). The various reusable melt containers and injection bells discussed herein can be used in this fashion. As depicted in FIG. 2, the injection material 109 can be added to the melt container 104 through an opening 204 that is converted into the thermally actuated opening/closure 106. As depicted, it is often easiest to add the injection material 109 into the original top of the melt container 104 and then rotate the melt container so that the original top of the melt container becomes the bottom that is the portion first entering melt 111. The melt containers and injection bells 102 can be similar to those discussed with respect to FIG. 1 and the process is also very similar to the one previously discussed. Note that the combustion of the carbon shown as included in the container can be important, in certain applications, to compensate for the cooling effects on the existing melt already contained in the torpedo car.

Consumable Container Systems

Figure 3:
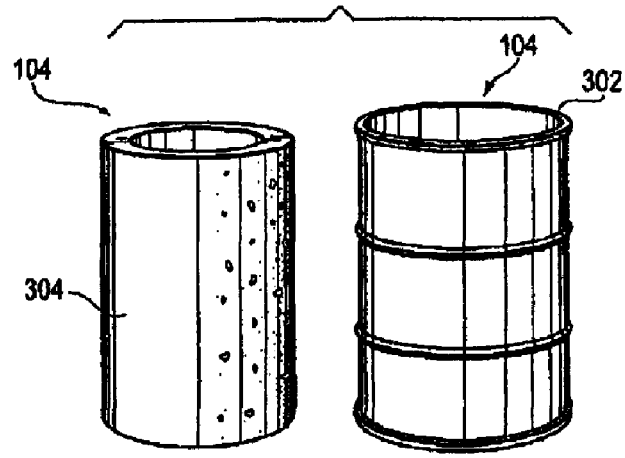
FIG. 3 shows one form of the invention that uses a consumable container to ad materials to a metallurgical process

FIG. 3 shows features and operating elements of a basic melt container 104 that is particularly applicable to applications where melt container 104 is largely consumed (or melted into the melt) during use. For example, such consumable melt containers can be made from new or used 55 gallon steel drums 302 or from iron or concrete pipe 304 or from tin cans, such as soup cans. If solid Fe fines (having a density of 7.85) are placed in a 55 gallon drum, the drum will hold approximately 1630 Kg or 1.6 Long Tons of fines. In appropriate instances, the iron fines can be mixed with voids or with other materials having a different density than the iron fines. For example, if the injection material (comprising the iron fines and either another material or voids) has a density of about 5, then the drum will hold approximately 1.0 Long Tons. Other materials may be added to decrease the weight of the filled drum to minimize premature failure or to include other materials, such as carbon containing materials that may be beneficial to the production of steel. Materials such as coal, coal fines and coke dusts or other BTU producing carbon-containing materials, or other materials aimed at heat production (such as bitumens and tars), oxide reduction, recovery of contained chemical elements, or even for disposal of such materials can be added. For example, polymers or elastomers might be added to carbon load the injection material while at the same time utilizing waste material that might otherwise wind up in a landfill. Since many plastics are petroleum products, the addition of certain plastics and/or rubbers will result in a net positive contribution of energy to the melt 111. Such consumable containers can be machine loaded using commercially available equipment designed to fill similarly constructed containers with dry materials.

FIG. 4 illustrates where a melt container 104 may be introduced into a typical blast furnace 400. Some of the possible injection points are labeled X, Y and Z in the figure. For example, melt containers 104 can be introduced along with the iron ore and other materials into the loading mechanism, labeled X, of a typical blast furnace 400. This method is probably best used with a consumable melt container 104, where an injection bell might not be recoverable or needed. In another form, the melt container 104 can be introduced into the ductwork 402 (see Y) that vents the waste heat from the blast furnace 400. In another form, the melt containers 104 can be introduced into the torpedo car 202 (see Z) as discussed with FIG. 2. This form is probably best used for recoverable containers or for recoverable injection bells.

Subsystems and Features

Figure 5:
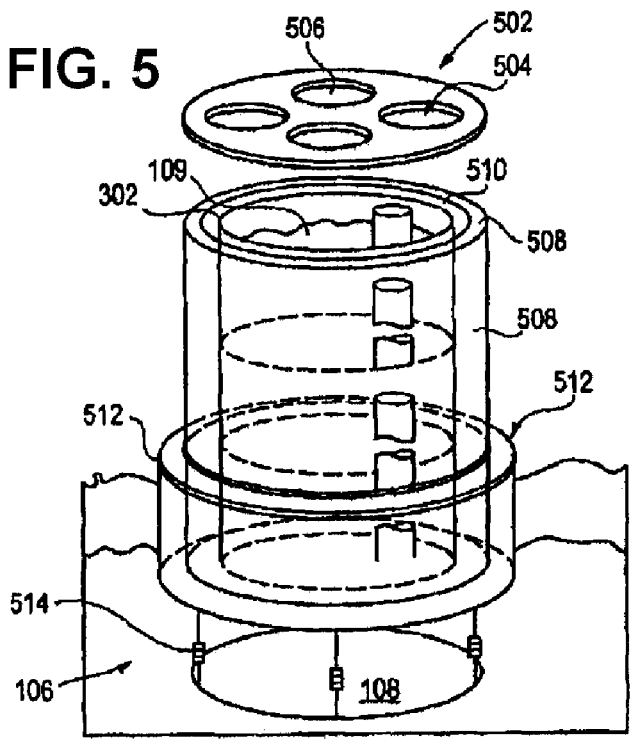
FIG. 5 shows another form of a the invention that uses a reusable container having a fusible opening/closure.
Figure 5A:
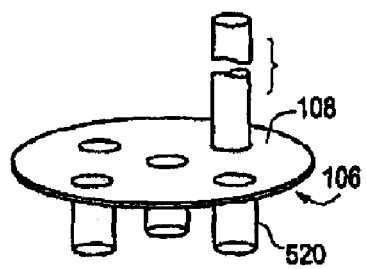
FIG. 5A shows an alternate form of the fusible opening/closure of FIG. 5

FIGS. 5 and 5a show some optional features and structural elements of the various sub-systems useable in circumstances as noted such as enhanced heat transfer, gas venting, corrosion protection of reusable components etc. Many of the elements and functions discussed here can be associated with the melt container 104 and/or the injection bell 102. Obviously, many of these design elements can be used separately or in combination with one another depending upon whether the container and its associated accessories are to be considered totally consumable (e.g. dropped in a blast furnace) or partially re-useable, e.g., in a torpedo car or other liquid metal seal process. A vented top 502 can include vent openings 504 through which gases can be vented. Depending on the size of vent openings 504 and the application, a dust filter cover 506, such as reinforced fiber glass cloth or a wire or fiber glass mesh screen, can be used to prevent the injection material 109 from escaping out of melt container 104 through vent openings 504.

A reusable protector 508, such as a ceramic or metal enclosure (or cage) made from a suitable material, such as a ceramic or alloy having a high thermal conductivity, can be used to protect the melt container 104 before reaching the targeted injection depth in a liquid metal seal process while still conducting heat to melt container 104. A thermal insulating material 510 can surround melt container 104 to act as an insulator and control the amount of heat transmitted to the melt container 104 over time. Where the melt container 104 is consumable, thermal insulating material 510 can be used to control the depth at which the melt container 104 is consumed in melt 111 or in a blast furnace. A reusable and/or replaceable anticorrosion submersible collar 512 can be used to protect the bottom portion of the reusable protector 508 where it comes in contact with the molten metal of melt 111.

Reusable thermally actuated bottom opening/closure 106 can be provided. In one form, reusable thermally actuated bottom opening/closure 106 comprises reusable bottom door 108 coupled to one or more of collar 512, protector 508 and/or melt container 104. A fusible closure system 514, such as fusible link bottom clamps or consumable inserts (or other fusible closures) can be used to couple reusable bottom door 108 to collar 512, protector 508 and/or melt container 104. In one form, a fusible closure system 514 is used in conjunction with a non-fusible coupling (not shown). In use as the melt container 104 is lowered into the melt 111, the fusible closure system 514 begins to heat up and melt, thereby actuating the bottom opening/closure 106 so that it is open. The non-fusible coupling is linked between reusable bottom door 108 and another reusable component, such as reusable collar or reusable protector 508 so that the reusable components can be retrieved more effectively. In another form, a consumable bottom opening/closure 106 is used that melts or burns when heated to an appropriate temperature. For example, consumable bottom opening/closure 106 can be comprised of iron or even fashioned from an appropriate fabric with a high melting temperature, such as Nextel Fabric which can reach temperatures exceeding 1370° C. compared to an iron melting point of 1535° C. Such fabric can also be used as a dust filter, as discussed elsewhere in the application. In one form, an open metal grate or mesh can cover the bottom of the Nextel Fabric to provide additional strength and aid in the prevention of the premature deterioration of the fabric due to the weight of the injection material.

The fusible closure system 514 can perform double duty by coupling reusable bottom door 108 to reusable protector 508 or reusable collar 512 so that melt container 104 is supported by the rest of the structure until fusible closure system 514 melts releasing melt container 104 into melt 111. In another form, a magnetic coupling (such as an electromagnet coupling) is used to support the melt container 104 until the magnetic field is decreased (or removed) releasing melt container 104 into melt 111.

Either way, the fusible closure system 514 or the magnetic support can be designed to melt open opening/closure 106 (or release melt container 114) in a specific range of injection temperature, in a specific height range above the surface of melt 111, or a specific depth range below the surface of melt 111). In one form, the bottom opening/closure 106 can include heating tubes 520 that extend internally within melt container 114 to increase the surface area where radiant heat from the blast furnace can transfer heat to the injection material 109.

Figure 6:
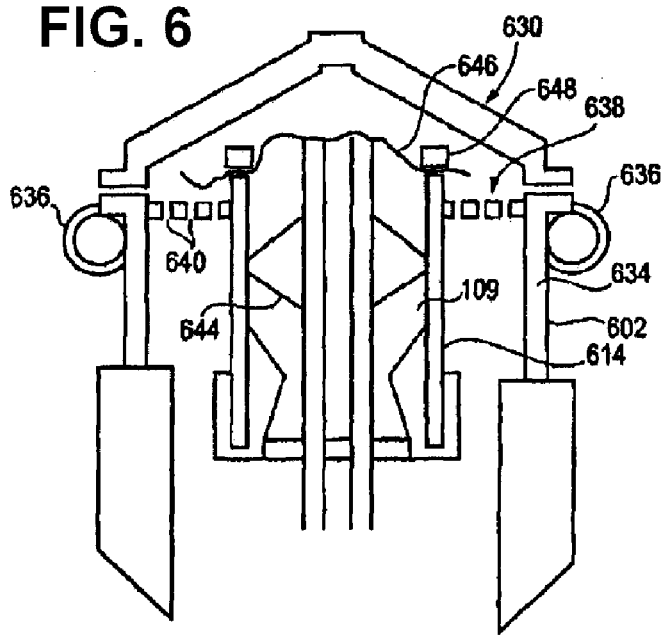
FIG. 6 shows an alternative form of the reusable container of FIG. 1.

FIG. 6 illustrates one form of a reusable injector bell 602 with a reusable container 614 (similar to melt container 114 for holding injection material or iron "fines") that can be top-filled. Reusable container 614 can be integrated as one individual unit with reusable injector bell 602 or coupled to injection bell 602 in any appropriate manner. The reusable injector bell 602 includes a removable top 630 that is removed when the injection material 109 is inserted at the top of the injector bell 602 and into the open top of the reusable container 614. The removable top 630 is coupled to the body 634 of injection bell 602 using a coupler, such as eyebolts 636 that are threaded through at least one of the body 634 and the top 630. Eyebolts 636 can also be used to maneuver and raise or lower injection bell 602. Injector bell 602 can include corrosion and mechanical shielding, which can either be formed as an integral part of injection bell 602 or coupled to injection bell 602 in any appropriate manner.

In one form, reusable container 614 is coupled to injection bell 602 with a perforated flange or web 638. Web 638 is permeable to through a series of thermal channels, or openings 640 gases and provides a fluid connection between the gas in body 602 and top 630 portions. Additional thermal channels, such as thermal conduction cylinders 642 are provided through reusable container 614 to allow for additional conduction of heat to the injection material 109. In one form, cylinders 642 are supported by webbing 644 and can be gas permeable. A dust filter 646 is provided wherever appropriate to prevent injection material 109 from falling out of, or blowing out of, reusable container 614. In the depicted form, dust filter 646 is coupled to the top of reusable container 614 with clamps 648. However, if thermal conduction cylinders 642 have relatively large openings, then dust filters can be placed surrounding the thermal conduction cylinders 642. Either a consumable or reusable opening/closure can be used. In the depicted form, only the dust filter and fusible closure (or consumable opening/closure) would typically need to be replaced after each use.

Figure 7:
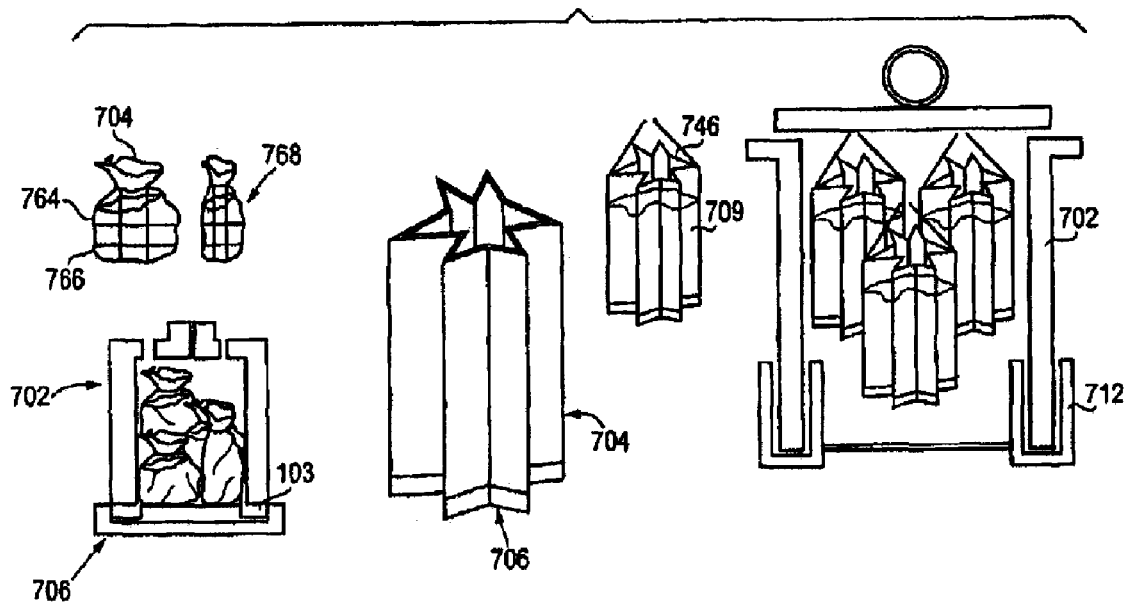
FIG. 7 shows alternative forms of a reusable container of the invention and consumable containers used in conjunction with reusable containers.

FIG. 7 displays some of the many container designs that can be used in multiple combinations to achieve particular performance goals and capabilities. For example, consumable melt containers 704 can be formed from flexible material, such as high temperature cloth 764 or screen-material that are basically tied up like sacks or formed into bags 768. A reinforcing material 766, such as a metal screen or wire grid can be used to surround the high temperature cloth in order to give additional strength for the weight that will be supported and to prevent premature failure. The consumable bags 768 are filled with injection material 109 that can be premixed, such as by providing crushed coke or other materials in addition to the iron fines to provide a custom chemistry for the particular batch of steel. The bags can include protective thermal insulation that can be used to tailor the release profile versus the ambient temperature or to delay the release of the contents until the bag 768 has reached a certain temperature. Such thermal insulation material may also allow for the use of a cheaper material (that degrades when exposed to heat) to be used for strength of the bag 768 and the insulation material to prevent premature failure if the cheaper material reached a critical temperature too quickly. In one form, the consumable bags 768 can be used to fill a consumable container (like 104) or injection bell 702. Like other examples, injection bell 702 can include an opening/closure system 706 that uses fusible links 103 or fusible clamps. Such fusible links or fusible clamps (used either here or in other examples) can include a protective thermal insulation that can tailor the release profile versus the ambient temperature to delay release of the injection bell 702 contents.

In some application, it can be advantageous to use a consumable container 704 designed to have a large surface area in contact with the hot air from the blast furnace and eventually melt 111 in order to increase the amount of heat thermally conducted to the injection material 709 inside consumable container 704. In some cases, the increased surface area consumable containers have a cross section that is somewhat star-like in shape. Such consumable containers 704 can be used with the various options discussed in other examples, such as injection bells 702, reusable submersible collars 712 for corrosion protection and mechanical shielding, and gas permeable fabric dust covers 746.

Figure 8:
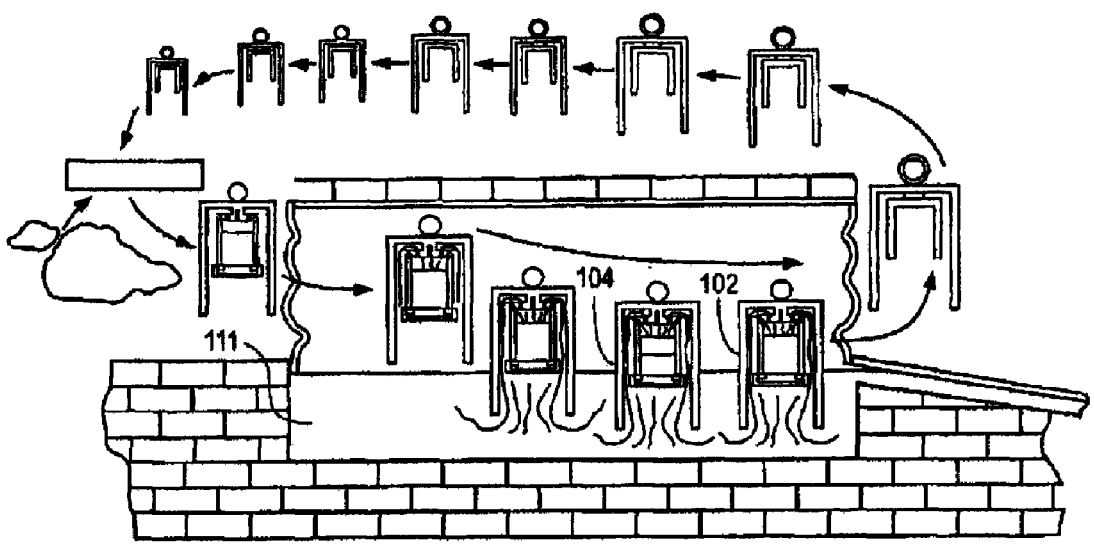
FIG. 8 shows an expanded form of the process shown in FIG. 1.

FIG. 8 depicts a schematic of a continuous processor of injector bell container loads being injected into a liquid metal pool using sub-surface injection and liquid metal seal. This process can be adapted to the various examples of consumable containers and injection bells described in the application. As the injection bell 102 and melt container 104 contacts the liquid metal melt 111, the portions of the injection bell 102 and melt container 104 below the surface of melt 111 acts as a sealing mechanism that is continuously tapped to harvest the metal recovered from the injection material. This sealing mechanism causes the injection material to be introduced below the surface of melt 111 and prevents any fines from being blown around. The chemistry can be adjusted on a batch-by batch basis. This can be used to implement a closed loop production system when combined with standard fast chemical analysis instruments.

Figure 9:
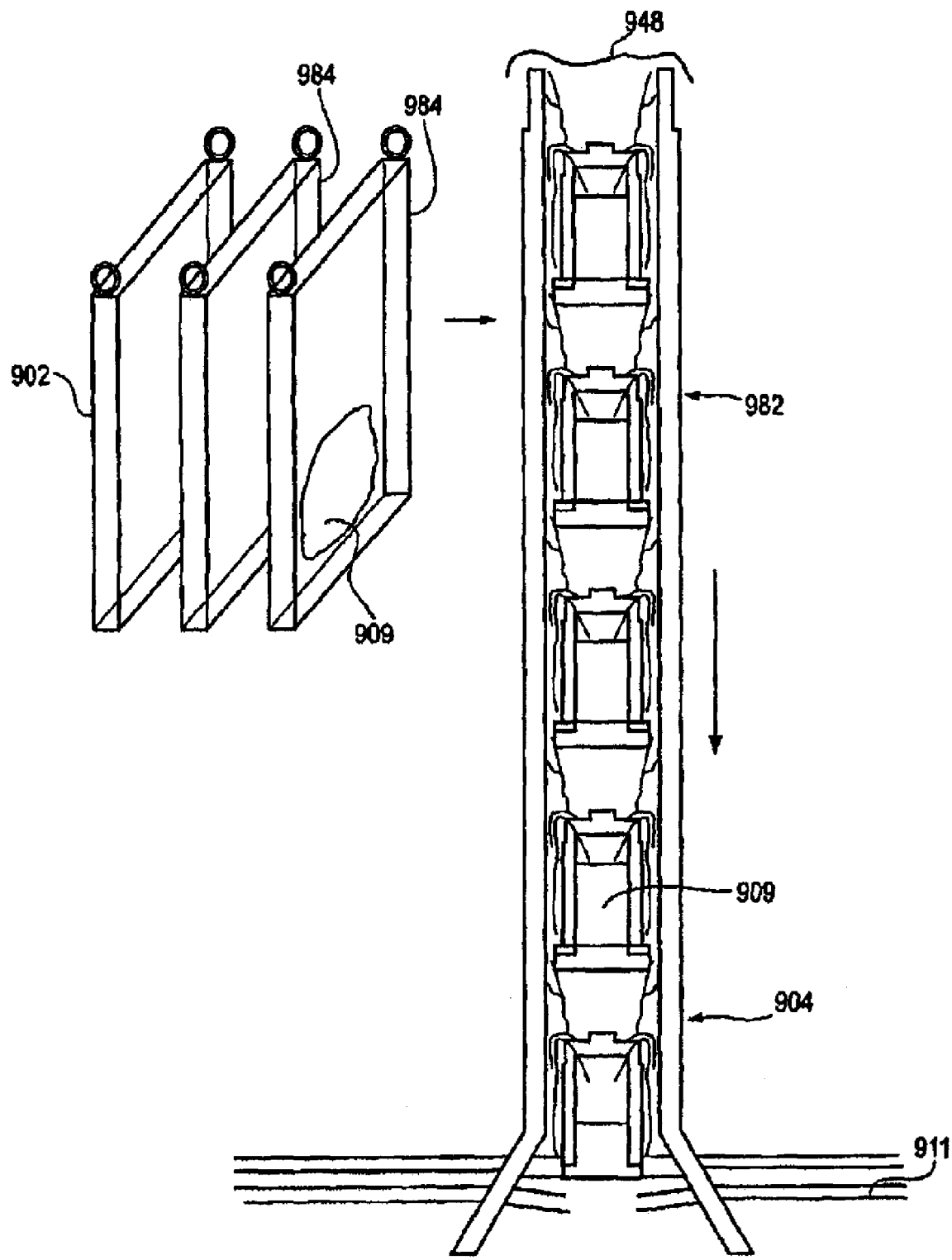
FIG. 9 shows an alternative form of reusable containers of the invention used in conjunction with an optional elevator style feed.

FIG. 9 shows an arrangement that uses one injector bell 104 structure that serves a series of melt containers 102 with the added advantage of inherent pre-heating in the bell "chimney" or duct 982. Like other forms, it can use totally or partially consumed melt container 902 components. Unlike other forms, it uses an elongated injection bell 904 having an elongated duct 982 or elevator through which multiple melt containers 902 are lowered one after the other (such as by connecting loops 984 to wires (not shown) to lower containers 902. As one melt container 902 enters melt 911, at least one other melt container 902 is getting pre-heated in duct 982 as it follows the previous melt container 902 in duct 982. This allows for a faster injection sequence and for pre-heating of the injection material 909, which can be beneficial because it allows for drying and pre-heating of the injection material 909. Note that combustion of carbon-containing materials in the containers will contribute to rapid reduction of the scale oxides as the temperature rises during the pre-heat and actual injection. Under some circumstances, the drying and pre-heating may not be necessary and the arrangement might just be used for speed. In such case, a water-cooled mechanism (not shown) can be used to cool the melt containers 902 while they descend in the duct. A dust filter can be provided at the top of injection bell 904 if desirable. In one form, a melt container 902 having an increased surface area for heat transfer purposes can be used. In one form, a bread-slice container geometry may be practical which takes advantage of the high internal friction exhibited by the sharply angular grains characteristic of crushed Mill scale and similar materials. In other words, a melt container can have one dimension relatively thin (especially when compared to the other two) somewhat like a slice of bread. In one form, the flat surfaces of the bread-slice can be corrugated to enhance heat transfer and reinforced with cross-members. These flat melt containers 902 can be rather weakly constructed, consumable, and fitted into re-usable frames 984 of ceramic and/or high temperature alloys.

Blast Furnace Processing

The various consumable containers described herein (above and below) can be introduced into a blast furnace (or other metallurgical process) using any convenient method and access point. One form of the route for such injection is via the same mechanical access and loading mechanisms associated with the "bell" at the top of a blast furnace (see entry point X in FIG. 4) that are now used to load prepared iron ores for processing in the furnace stack. The melt containers, including capsules filled with mill scale are simply dropped into the blast furnace along with ore. As indicated in FIG. 1 and elsewhere, other injection processes are also possible.

FIG. 4 shows a typical blast furnace. A more thorough explanation of how a blast furnace works is currently available in an article entitled "How a Blast Furnace Works" by John A. Ricketts of Ispat Inland, Inc. It is available through the American Iron and Steel Institute Steel Works at http://www.steel.org/learning/howmade/blast_furnace.htm at no cost. The text of this document is incorporated herein by reference and we credit Mr. Ricketts for the information, which we have made fair use of in the following description. A typical blast furnace has a large refractory brick lined stack that forms a chamber in which the raw materials are processed as they are exposed to the heat from the furnace. The raw material ingredients for manufacturing steel, such as iron ore, coke and limestone, are placed into skip cars that travel on rails to the receiving hopper at the top of the furnace. The raw material ingredients are held until a charge, typically comprising a metallic component (ore, pellets or sinter), coke and flux (limestone) have accumulated. The filling order of the charge is carefully managed to control gas flow and chemical reactions inside the blast furnace. The ingredients are typically charged into the chamber of the blast furnace through two stages of conical bells that seal in the gases and distribute the raw material ingredients evenly around the circumference of the furnace chamber. Instead of bells, some furnaces have 2 or 3 airlock type hoppers that discharge raw materials onto a rotating chute which can change angles allowing more flexibility in precise material placement inside the furnace.

Preheated air is blown into the bottom of the blast furnace and ascends to the top. It can take 6 to 8 hours for the raw materials to descend to the bottom of the furnace where they become liquid slag and liquid iron and are drained at regular intervals (thus allowing the raw materials on top to descend).

Iron oxides are introduced into the blast furnace in the form of iron ore, pellets or sinter. The iron ore is typically sized into pieces that range from 0.5 to 1.5 inches. As they descend in the stack, the iron ore, pellets and sinter become liquid iron and impurities become part of the liquid slag. Coke is typically produced by crushing and grinding coal into a powder and then charging it in an oven. Different sizes of coke are separated by screening different size pieces, such as a range of sizes from one inch to four inches. Limestone is prepared by crushing and then is separated according to size by screening different size pieces, such as a range of sizes from 0.5 inch to 1.5 inch. Limestone is used as the blast furnace flux, which becomes the slag that removes impurities. The different sized ingredient materials are then charged into the furnace top in appropriate percentages (of material and material sizes) for the metallurgical process and to prevent blocking the hot air flow from the bottom of the stack.

The iron ore, pellets and sinter are reduced when the oxygen in the iron oxides are removed by a series of chemical reactions. These reactions occur as follows:

$$3Fe_2O_3+CO=CO_2+2Fe_3O_4 \text{ begins at } 850° F. \quad (1)$$

$$Fe_3O_4+CO=CO_2+3FeO \text{ begins at } 1100° F. \quad (2)$$

$$FeO+CO=CO_2+Fe \text{ or } FeO+C=CO+Fe \text{ begins at } 1300° F. \quad (3)$$

As the iron oxides are going through these reactions, they soften, melt and the liquid iron trickles through the coke to the bottom of the stack. The coke also descends to the bottom of the furnace and is burned by the hot blast from the bottom of the furnace to generate heat and is reduced to carbon monoxide, which is used to reduce the iron ore.

$$C+O_2=CO_2+heat$$

$$CO_2+C=2CO$$

The limestone descends in the stack goes through the following reaction at about 1600° F.

$$CaCO_3=CaO+CO_2$$

The CaO formed is used to remove sulfur from the iron.

$$FeS+CaO+C=CaS+FeO+CO$$

The CaS becomes part of the slag, which also contains any remaining impurities like Silica ($SiO_2$), Alumina ($Al_2O_3$), Magnesia (MgO) or Calcia (CaO) that might have been introduced with the iron ore, pellets, sinter or coke. The liquid slag trickles through the coke bed to the bottom of the furnace and floats on top of the liquid iron.

In one basic form of the containerized process disclosed here, the iron scale is loaded into low cost consumable capsules and then added directly into a blast furnace or other metallurgical process by either including them in charge or adding them separately from a typical charge to the rest of the burden in the chamber. Using simple reliable mechanics, materials, and thermal design, the capsules can be designed to disassemble at a controlled depth in the blast furnace stack sufficiently below the top of solid materials in the stack to prevent any fines from being blown about by the air blast.

Figure 10A:
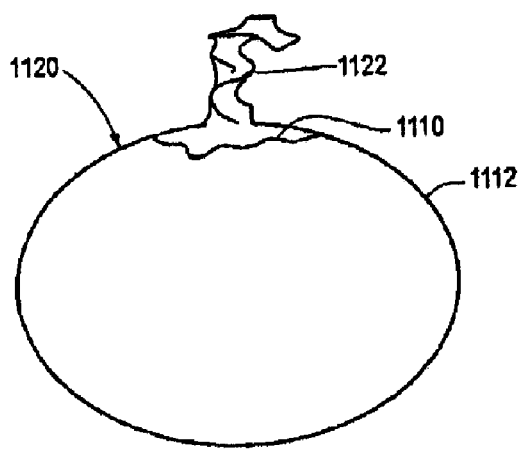
FIG. 10A shows one form of flexible consumable container.
Figure 11:
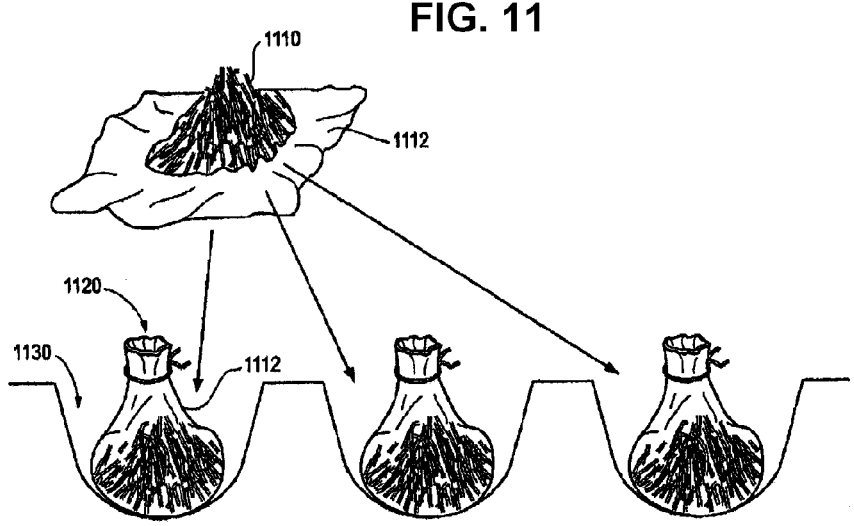
FIG. 11 shows one method of loading material inside a flexible container.

Referring to FIG. 10A, clean scale 1110 has been crushed to particles, if necessary, and mixed, if desired, with particles of other substances such as carbon-containing compounds (or other additives) to make up the injection material. Clean scale 1110 (either pure or the resulting mixture) is wrapped in a strong high temperature fabric 1112 that is preferably gas permeable. Fabric 1112 may woven, matted or felted. The wrapping process can be as simple as depositing an appropriate quantity of scale 1110 on a pre-cut sheet of sufficient size of the fabric 1112 (as shown in FIG. 11), picking up and bringing the corners of the fabric plus a suitable margin together and finally twisting the excess material together to form a tightly closed "bag-like" capsule 1120 or melt container that encapsulates the granular injection material. The twisted "neck" of the bag can be closed in any appropriate manner, including being knotted, tied using high temperature rope, clamped or otherwise fixed or secured against untwisting and/or opening. Loading and wrapping steps can be automated or semi-automated and designed to use minimal amounts of power-assisted human labor.

In this example, the capsule 1120 is seamless with one very strong closure that can itself include a loop, ring, attach point, handle, or other handling aid 1122. As will be discussed later, it is desirable to avoid any seams because sewing certain high temperature fabrics can introduce weak points in the capsule 1120 and needlessly increases cost as well. Many other wrapping techniques using high temperature fabric are possible using, for example, tubular, rather than flat woven fabric, can be used so a capsule 1120 would have two twisted ends (similar to a sausage link) with which to work.

In one form, capsule 1120 can be constructed of fabric 1112 in the form of flexible mesh sheets that are fabricated of materials that can withstand high temperatures, such as inexpensive iron or steel screening similar to window screen. Coarser or finer meshes can also be used, but the mesh should preferably be fine enough to prevent excessive amounts of the mill scale particles 1110 from falling out. In one form, more than one mesh layer is used to create a less permeable double wall, triple wall, or other multiple walls in order to prevent fine mill scale particles from leaking out of capsule 1120. To reduce the leakage of mill scale fines, capsule 1120 can be formed from a fibrous filter-like mat material (not shown) which can, for example, be non-woven fiber glass strands sandwiched between layers of the coarser mesh (such as the metal screening material). Such materials can be less costly than finely woven fabrics. In one form, the mesh sheets and the fibrous-like mat material can be used in conjunction. This is advantageous in situations where the fibrous filter-like material is not of sufficient strength and the mesh sheets are not sufficiently fine. In another form, strapping, webbing or other material can be used to reinforce capsule 1120. A fusible adhesive joint can be used to close the fabric and the adhesive can be selected to melt at a particular depth in the molten metal to release the material in capsule 1120.

The capsule 1120 walls can also include a material such as glass particles or other substances that melt part way down the downward traverse of capsule 1120 in the furnace. Such materials can cover the outer layer of the contained mill scale in an adhesive "sticky" semi-molten layer that slows the release of mill scale even as the capsule continues to lose integrity due to the rising temperatures encountered as the capsule sinks lower.

Figure 10B:
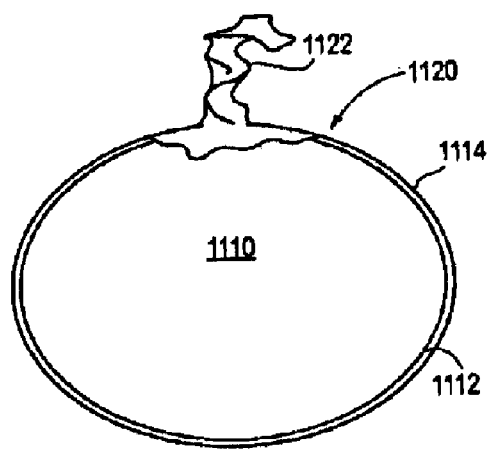
FIG. 10B shows the flexible consumable container of FIG. 10A with an optional abrasion resistant coating

Referring to FIG. 10B, there is depicted a cross-section of a capsule covered by an optional gas permeable anti-abrasion and/or reinforcement layer 1114. If actually needed—a question to be decided by simple experiments knowing the particular blast furnace design involved—this layer can take the form of an open-weave fiberglass net or screen, a few fiberglass straps or ropes or soft iron screening similar to coarse window screen, or even a coating such as a silicone coating. The need for this added protection might arise with relatively large capsules that are used in blast furnaces where the free-fall drop from the bell to the top of the charge of material in the stack might be unusually large, thus producing large instantaneous bursting forces.

Figure 13:
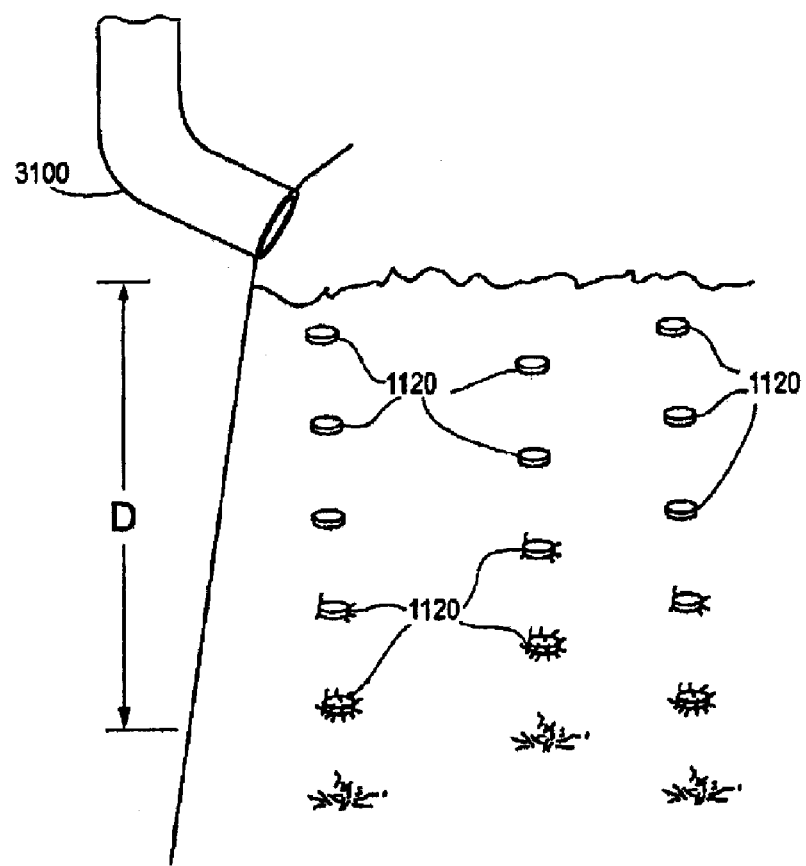
FIG. 13 shows one distribution of consumable containers in the blast furnace burden.
Figure 14:
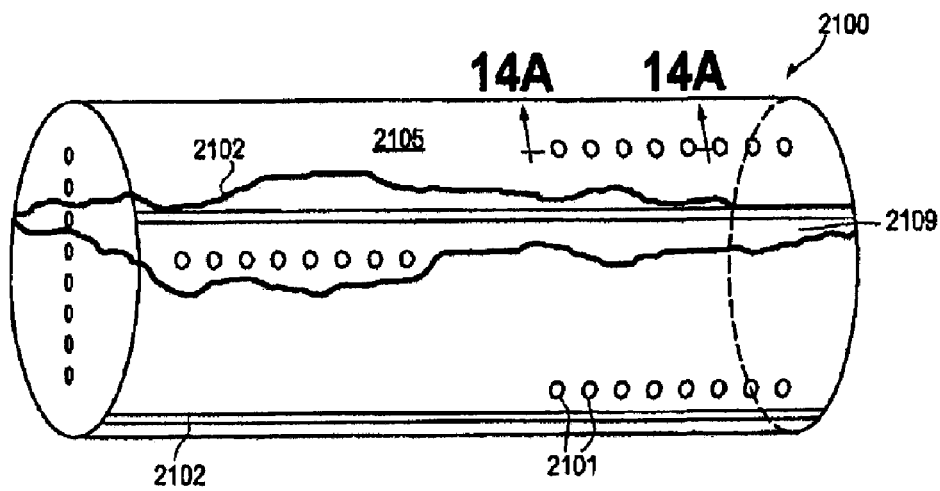
FIG. 14 shows one form of consumable container having vented openings.
Figure 14A:
FIG. 14A shows the cross section of a portion of the container in FIG. 14 taken along line 14A-14A.
Figure 14B:
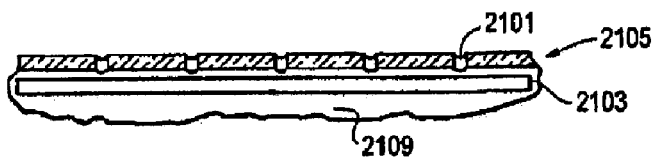
FIG. 14B shows an alternative cross section of the container in FIG. 14.
Figure 14C:
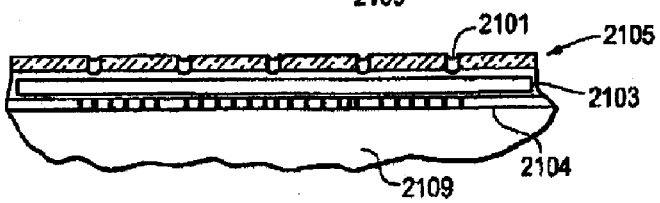
FIG. 14C shows an alternative cross section of the container in FIG. 14.

If readily accommodated by the configuration of the bell of the blast furnace, a simple mechanical slide (see 3100 in FIG. 13) might be used to reduce the free-fall distance. In another form, such slide may consist of a number of spaced apart rails along with capsules can slide in order to minimize impediments to gas flow. It should be noted that, at time of injection, the temperature of the fabric (which is in good thermal contact with the heat sink of the mill scale load) will be near ambient. At ambient temperature, the specific strength of the fabric fiber is about three times stronger than steel. Also, as discussed further below, a very simple and low cost surface treatment can be used to mitigate fiber-on-fiber abrasion that might otherwise reduce effective fabric strength somewhat.

Figure 10C:
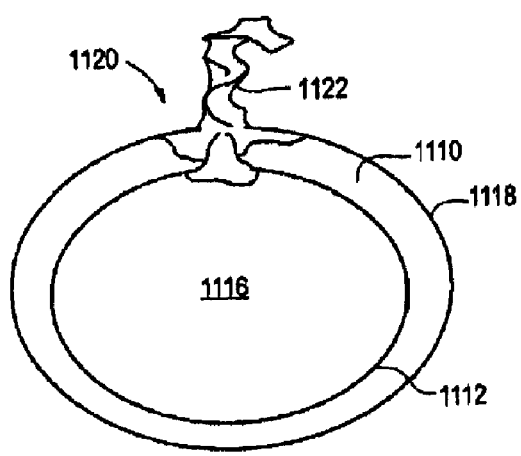
FIG. 10C shows a second flexible consumable container within the container of FIG. 10A separating clean materials that surround contaminated materials in the second container.

Referring to FIG. 10C, there is shown one method of how oily hydrocarbons and grease-bearing mill scale 1116 can be processed. The fundamental problem with injecting such contaminated substances 1116 into a blast furnace, aside from the dispersal problem previously mentioned, is that the unprotected hydrocarbons rapidly volatilize in the upper part of the blast furnace (at 600-800 F) and quickly exit with the blast gases through the top of the furnace. This can seriously contaminate the downstream gas-handling and cleaning systems of the plant.

In one form, a volume of oily or contaminated mill scale 1116 is encapsulated in fabric 1112, is further enclosed in a surrounding bag (or capsule) 1118 containing clean scale 1110. This arrangement uses the clean scale 1110 both as an iron source and a heat shield and insulator for the oily scale 1116 which, in turn, allows the combined capsule to submerge to significantly deeper levels in the blast furnace stack before the hydrocarbons get hot and escape through the nested fabric enclosures. At such greater release depths, the temperatures can be hot enough and the upward transit times long enough to decompose and incinerate the escaping hydrocarbons before they can reach the top of the blast furnace charge and cause downstream problems. This technique of surrounding contaminated mill scale 1116 with clean scale 1110 can be used with any of the container designs and any materials disclosed herein.

Combustion of these hydrocarbons can also contribute to improving the heat balance of the overall blast furnace process. In the event that the oily scales heat up at too shallow a depth, a thermal control wrap, such as a wrapped layer of thermal insulation 1119 (shown in FIG. 10D) can be employed. Importantly, this insulation layer 1119 (whose permeability can be increased if necessary by punctured slits or holes) accomplishes its purpose long before very high temperatures near the base of the stack are reached so the insulation need not resist long-term or very high temperatures and is therefore not cost-prohibitive. Insulation layer 1119 can be formed of any suitable material. For special situations, in addition to less costly and common insulating materials, HYTEX 1000 textiles, aerogels, and high temperature fabrics, such as 3M's Nextel 440 could be used in an appropriate application.

Encapsulation Materials and Cost Considerations

Figure 18:
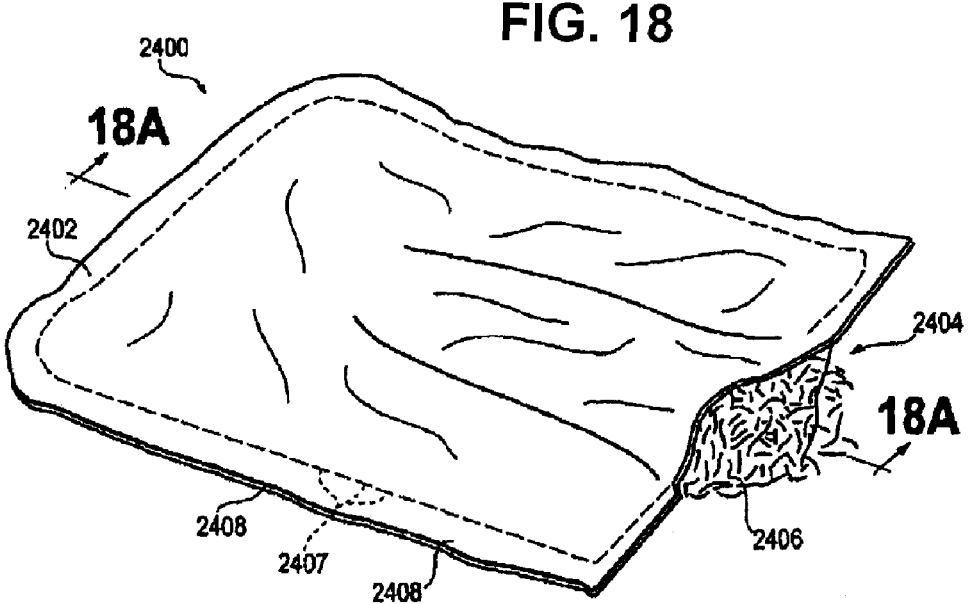
FIG. 18 shows one form of consumable container in a vented envelope form.

Although what is believed to be a particularly simple approach to a container design and materials combination ideally suitable to use in existing blast furnaces is shown in FIG. 18 (and discussed in further detail below), the following descriptions demonstrate the versatility of the general approach and emphasizes that non-metallic materials and other structures can also be used where appropriate.

Examples of Some Materials

A large variety of high temperature tolerant ceramic fibers and glass fibers are available out of which to fabricate fabric wall capsules and other accessory items for the purposes outlined above. Ceramic fibers are substantially more expensive than glass fibers but may be useful in certain situations. In general, however, fabrics, mats, felts, ropes, straps, insulation, mats etc. made of glass fibers or metal mesh may be used. Within this category there are many options that are attractive. Advanced ceramic materials in various equivalent forms may be used for higher performance.

Glass fabrics are most commonly woven of so-called "E" glass or "S-2" glass. Both materials at ambient temperature exhibit a tensile strength per unit mass about three times greater than that of steel. Other much higher performance and generally more costly glass fiber compositions are also available for encapsulation use in special situations. These need not be discussed further in the present context of capsules which are intended, primarily, for blast furnace bell injection.

Fabrics etc made of so-called "E glass" are serviceable to 700-800° F. for some days without serious loss of strength while S-2 glass can operate at 1200-1400° F. Often these glasses are coated with very thin lubricant films when woven into fabric to reduce individual strand breakage due to inter-strand friction. The coating gradually departs the fabric over long exposure times and different coatings are more or less fugitive. Acrylic coats for example, are said to be good for up to 10 days at 800 F. Teflon could also be used.

A very convenient practice is merely spraying the bare "off-the-loom" fabric with silicone and can aid in providing an ant-abrasion surface. This results in good performance (better than 50% strength retention) after exposure to temperatures in excess of 650 F for 10 days. Substantially higher temperatures are well-tolerated for 24 hours or more. It should be noted that when serving as a capsule in a blast furnace stack, the fabric or matting will be in intimate contact with a large heat-sink (the large mass of the mill scale in the capsule) and this can help moderate any temperature degradation because the heat sink will slow down any temperature rise.

In any event, in the subject application the material is only required to be strong enough to withstand the mechanical shock of injection and the forces experienced as the capsule submerges into the stack. During a period of time (probably several hours or less), the capsule descends to levels where the temperatures in the stack is high enough to cause it disintegrate and release its contents into the stack. The release depth is preferably deep enough so essentially none (or the amount is minimized) of the capsule contents (iron-bearing particles or un-decomposed hydrocarbons if present) can escape out the top of the blast furnace stack.

While descending through the stack the capsule will be subject to external forces from adjacent bodies (or capsules), pieces of ore, and other solids. In the stack, the fabric is supported to some degree, by the capsule contents hence the net unsupported loading against the capsule fabric is expected to be rather small. In fact, the industry uses the so-called Mullen Burst Test in which a small steel ball is pressed against the unsupported fabric. At temperatures and exposure times of interest here, the penetration or burst resistance of the fabrics of interest exceeds several hundred PSI. A second aspect of the blast furnace environment that may need consideration is the possibility of erosion of the fabric due to abrasion or even "sand blasting" by particles being transported upward through the stack by the air blast. The packing is such that the mean free path of these particles should be very short, hence their impact velocities should be low. Furthermore, hydrodynamic shielding effects in the flow field may also be beneficial. A somewhat thicker fabric or mat (or other materials that comprise the capsule wall) may be expected to solve most if not all such problems if they are significant in particular situations.

An Illustrative Design

The specifications and characteristics for a stock fiberglass fabric #7628 made by BGF Corporation of Greensborough, N.C. will be used, although many other fabric and material options exist.

Fabric

Weight: 6 oz per square yard.

Roll width: 50 inches

Roll Length: 3000 yards

Off the Loom (uncoated): $1.50 per yard

Material Cost per 50"×50" Square Sheet: $2.08

Capsule

Single Wall Capsule (per FIG. 10A) Assumed Dimensions:

Spherical Shape (approx): Radius R=30 cm (12 inches)

Volume: 4/3×3.14×30^3=113000 cm3

Surface Area: 4×3.14×30^2=11300 cm2=1752 in2

50"×50" fabric sheet (2500 in2) sufficient to completely enclose 24" diameter sphere (Neglects Minor Additional Amounts of Fabric Needed for "Twist" Closure)

Weight of Scale per Capsule (assumes density of ~2.0) 226 Kg=500 lbs

Four capsules per ton=$8.32

Conclusions Re Encapsulation Materials Costs:

FIG. 10A design—Material Only—probably about $10 per Ton of Scale

FIG. 10C design—Material Only—probably about $16 per Ton

Figure 10D:
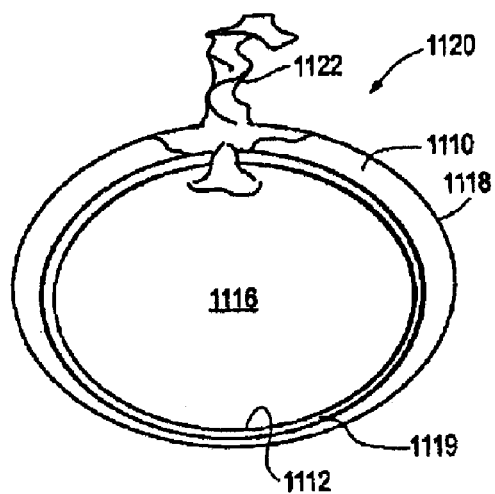
FIG. 10D shows an optional insulation layer in the consumable container of FIG. 10C.

Features shown in FIGS. 10B and 10D will add to these costs (maybe 25%)

Costs vary as an inverse function of radius of Sphere (Surface/Volume ratio goes as 1/R).

Materials cost for FIG. 10A design (30 inch dia.) would be ~$6.60/Ton

Materials cost for FIG. 10C design (18 inch dia.) would be ~$11.00/Ton

Filling Mechanisms

FIG. 11 is intended to illustrate schematically just one of many possible preparation alternatives for filling the capsules 1120 and encapsulating the mill scale 1110. In one form, standard machinery design practices can be employed to produce the filled capsules 1120. Techniques and mechanisms derived from extensive experience and highly developed art in the high-speed food canning and other materials handling fields are particularly relevant. In FIG. 11 (which are merely meant to be a low tech suggestive illustration) we pile a controlled quantity of mill scale 1110 on top of pre-cut fabric 1112 (or mat, screen or other suitable flexible material) sheets pre-positioned as liners in suitably configured depressions 1130. The fabric 1112 can be simple flat sheets or pre-fabricated with attach points or handles. Other techniques using large continuous rolls of fabric with the cutting operation integrated with filling are also possible. The scale can be magnetically separated (if, for example, it is Magnetite) or mechanically screened (if, for example, magnetic methods are inapplicable) and crushed before dumping into the depressions 1130.

Assuming one wishes to process 1000 tons of scale per 24 day and that each capsule accommodates 500 pounds of scale, 4000 pieces of fabric would be consumed in capsules 20 of the type shown in FIG. 10A. These must be efficiently and economically filled by any appropriate means.

A Simple Production System

A large flat surface 1132 arrayed with appropriate depressions 1130 (somewhat like a muffin pan) forms the basis of one simple approach to filling capsules 1120. As shown in FIG. 11, the depressions 1130 are pre-lined by laying fabric sheets 1112 in them and hooking their corners or otherwise holding the fabric in place. Crushed and sieved scale 1110 can then simply be dumped onto the surface 1132 and swept/pushed down into the depressions 1130 by a mechanized plow or a compressed air "blade" (not shown). Detaching the still-exposed fabric margins, twisting the tops and tying them can be done manually or automatically by machine. For example, if one hundred and twenty depressions 1130 were used and two persons could each tie-off one capsule 1120 per minute, the production rate would be one hundred twenty/hour or about nine hundred and sixty capsules per eight hour shift. The capital costs of such a system would be very small and the method is obviously arbitrarily scaleable.

Blast Furnace Loading and Capsule Cargo Distribution Control

Additional matters regarding capsule injection methods and apparatus may be found in the various figures and the accompanying text therein.

Standard ore loading routes (using specially outfitted skip cars or accessories mounted thereon as well as other handling methods for moving capsules 1120 from ground level up to the bell region) can deliver mill scale capsules through the well-known bell mechanisms at the top of a typical blast furnace (as shown by arrow x in FIG. 4). However other routes are also available, as indicated in FIG. 4, such as through the top cone or through the uptake wall or in a hot-metal car. Typically the path indicated by X would be used for single use capsules, the route indicated by the Y arrow might be beneficial to use waste heat to pre-process (such as drying and reducing the mill scale) and the capsules can be recovered and reused. The path indicated by Z is especially useful for re-usable capsules.

While this is certainly one general approach to utilizing the teaching of this invention, the mechanical design of the ore paths can be a constraint on the size of the capsules that can be used. To avoid this limitation, here disclosed are injection paths in FIG. 4: (1) going through the wall of one or more of the four large (up to 6 foot diameter) "uptakes" exhausting hot gases from the top of the furnace (indicated by the arrow labeled "Y") or (2) injection through openings penetrating the wall of the "top cone" of the furnace (indicated by the arrow labeled "X" in FIG. 4). Suitable capped openings typically already exist in many blast furnaces for access during servicing. To disburse the landing sites of the injected capsules, open rail or grid structures constituting slides which do not impede the gas flow inside the furnace may be employed. These may be mechanically moveable in elevation and azimuth to distribute the capsules more evenly. Another alternative is attaching the capsules to "clothes line" arrangements using moving wire cables or similar mechanisms combined with mechanically triggered release of a capsule when it is over a desired landing place.

Figure 12:
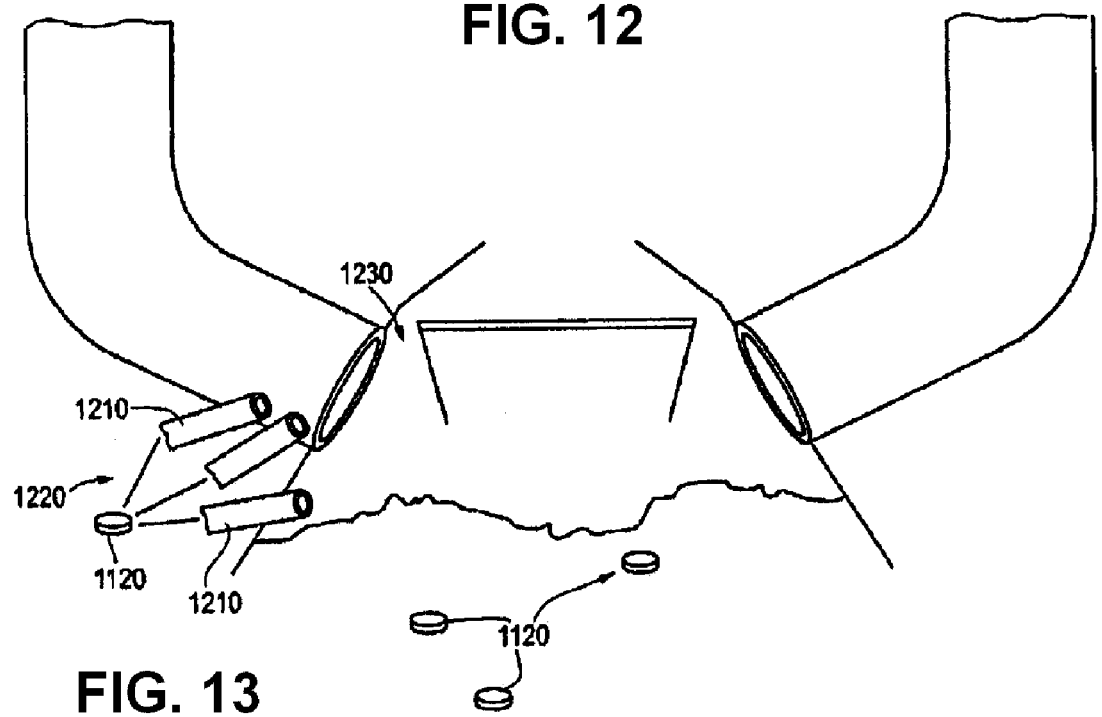
FIG. 12 shows one method for distributing consumable containers in the blast furnace burden.

Although all of the above techniques are useable, pneumatic injection can also be used. Referring to FIG. 12, a capsule 1120 is loaded into a tube 1210 (whose distal end is opened to the furnace interior 1230) and then injected by a sudden increase in pressure behind the capsule. Multiple arrays 1220 of such "gas cannon" tubes may be used. They are designed to have no moving parts inside the furnace perimeter and to not significantly impede furnace gas flow. They can be aimed at different azimuthal angles and elevations. Alternatively, a slewable (basically moveable left, right, up and/or down) system can be used. The aim points can be varied by changing the delivered gas impulse from shot to shot. The whole injection system can be computer-controlled and programmable to deliver the capsules with particular aim points and sequences to approximate a predetermined three dimensional distribution of the capsules 1120 (see FIG. 13). The materials to seal various capsules 1120 can be chosen to melt or fail at specific depths in the burden and the particular mix of a variety of capsules 1120 having different failure depths can be carefully controlled to control distribution of the failed capsules depths so that not all of the materials inside are released into the burden at the same depth.

The system can be "closed loop" using imaging devices to provide continuous data on location coordinates of recently already landed capsules in order to adjust the firing parameters used with subsequent capsules. This allows the blast furnace operator to maintain an optimal loading pattern of capsules despite variations caused by incoming ore drops and similar uneven slumping and randomizing effects at the top of the blast furnace burden. Importantly, this pneumatic injection method can be highly reliable and inexpensive to install and maintain. It requires no complex mechanics inside the hot blast furnace and is self-cleaning with each injection because each new capsule shot through the tubes will tend to clear out any excess fines.

In certain applications, it is preferred to limit the percentage, by total volume, of the capsules compared to the total volume of the rest of the bed of ingredients in the blast furnace in order to minimize impeding the hot air flow. In one form, it is desired to limit the aggregate volume of capsules to less than 50% of the volume of the bed in the blast furnace, or even less, such as less than 40%, less than 35%, less than 30%, less than 25%, less than 23%, less than 20%, less than 18%, less than 15%, less than 13%, less than 11%, less than 10%, less than 9%, less than 8%, less than 7%, less than 6%, less than 5%, less than 4%, less than 3%, less than 2%, or even less than 1%. Depending on the sizes and permeability of the capsule (and the material contained therein) to the blast air, the percentages may vary according to the composition of the capsules.

In one form, high temp fabric capsules can be made with release seams that disassemble at different temperatures and which are formed by thermally degradable fasteners, adhesives, stitching or the like. These can be designed to cause the capsule to release partial loads along its path downward into increasingly high temperatures. Metal and/or high temperature plastic sheets can be combined with fabric and/or insulating materials to create capsules providing distributed release profiles versus temperature. The metal and plastic components can be perforated to allow passage of gases into or out of the capsule content.

Remarks on Capsule Content

The content of a capsule or of sub-capsules (such as shown in FIGS. 10C and 10D) created by using the above described construction methods or those that follow can be composed of mill scales mixed with other materials (or containing entirely different substances such as carbon-containing chemicals or fluxes) that it is desirable to release at a different point in processing than other capsule content.

Since the mill scale does not have to be sintered (because it is encapsulated) the problem of using moisture laden scale can be approached in a different and energy efficient way by the methods herein disclosed. Scale with high moisture content can be spread into a comparatively thin layer a few inches thick under conditions where ambient atmospheric heat and gravity drainage processes can work over enough time (and without costly added energy input) to reduce the moisture. The scale is then encapsulated and loaded into the blast furnace. If oils/greases are present, these can slow moisture evaporation. On the other hand, these substances can advantageously add thermal BTU's (energy or heat) to the blast furnace energy input as the capsule releases its combustible content deep in the furnace stack where they will be consumed before they can escape out the uptakes.

While the primary focus of this disclosure is iron-making, the methods here disclosed can also be applied to many hazardous waste materials or other waste materials, whose decomposition products cannot not survive (as such) at the temperatures found deep in a blast furnace or similar processor. This means encapsulated wastes that might require costly treatment (by plasma torches or special incinerators etc. with high operating and fuel costs) could be rendered innocuous in blast furnaces or similar purpose-built facilities.

For example, tires, plastic or other waste material can be chopped up or shredded and disposed of by encapsulating them in the manner disclosed and being added to the blast furnace. Disposing of various materials in this manner can advantageously add thermal BTU's to the blast furnace energy with minimal pollution. In one form, such materials can be placed in the core of the capsule (where the oily scale 1116 is found in FIG. 10B or 10D) and then surrounded by clean mill scale inside the capsule and can include the insulation layer found in FIG. 10D to delay the impact of high temperatures on the shredded material until the capsule is deep within the blast furnace. However, it is also contemplated that waste material could be disposed of without the addition of the clean mill scale to the capsules. In another form, waste materials (or carbon containing materials, such as plastics) and mill scale can be mixed together within the same capsule, which can be further encapsulated by a layer of mill scale and an outer container. An additional layer of insulation can be used, similar to that shown in FIG. 10D.

Ferrous Wall Capsules

In addition to the previously disclosed use of meshes and perforated high temperature tolerant materials to construct consumable mill scale capsules, additional alternative designs that are believed to have desirable economic and other characteristics are as follows. It should be understood that many of the previously, disclosed concepts and alternatives can, as needed, also be used with the following designs.

Referring to FIGS. 14, 14A, 14B and 14C, a steel or sheet iron (for example) "can" similar to a soup can, a large food can, or a paint can be useful as a consumable capsule 2100 for mill scale recapture or for other waste processing purposes. In one form, the can-like capsule 2100 can be equipped with a variety of features that can make it more useful for mill scale recapture or for other waste processing purposes. For example, the capsule 2100 can be constructed from a perforated sheet 2105 or from a screen or woven metal material (see perforations 2101). Fusible joints 2102 (similar to those previously disclosed) can cause thermally triggered disassembly of capsules at a suitable depth in the furnace.

Additional material may be provided as part of the capsule wall or adjacent the interior or exterior of the wall to act like a filter 2103 to prevent the iron fines 2109 (and/or other materials) from falling through the perforated sheet. In one form the filter can be a woven fabric. In another form the filter can be of a mat-type or non-woven material. In either of these forms, the filter may be fabricated of any suitable material such as glass, ceramics, steel wool, high temperature substances, or any other suitable material. A support 2104 can be provided to act as an internal screen support to support the filter. In addition, (or instead) the wall material can be plated or can have other suitable coatings applied to the base wall material that can at least temporarily protect it from the effects of diffusion of extraneous substances that might produce carbonization or other weakening effects during exposure to furnace conditions. The metal wools shown in FIGS. 17 and 18 may be similarly treated.

Figure 15:
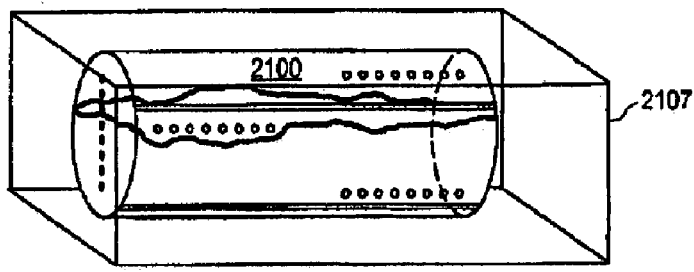
FIG. 15 shows an optional protective device surrounding one form of consumable container.

Referring to FIG. 15, the capsule 2100 can be enclosed in an easily consumable padding material 2107 to mitigate the impact of capsule 2100 as it impacts a surface (such as a bed of molten iron in a blast furnace). In one form, padding material 2107 can be made from a corrugated paper wrap or even a simple plastic sheet wrap to provide both impact protection and dust retention prior to and during loading into the furnace. In another form, padding material 2107 can be similar to a balloon and basically be a structure enclosing a volume of air.

Figure 16:
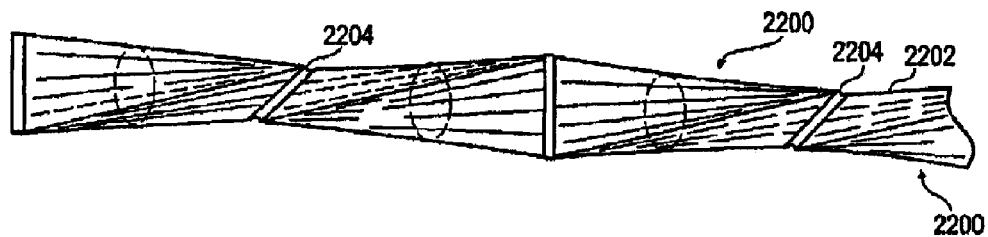
FIG. 16 shows another form of consumable container made in a sausage-link configuration.

Referring to FIG. 16, there is shown a capsule 2200 made from a sheet material 2202. In one form, sheet material 2202 is similar to the well-known "TetraPak" fluid containers. The sheet material can be made from a relatively thin metal foil and reinforced, if necessary. In one form, the orthogonality of the two relatively rigid clamping bars 2204 on each end of the capsule helps insure preservation of the internal volume against external pressure from the furnace "burden". These capsules can be fabricated in "trains" or links (like train cars coupled together or sausage links that are coupled together) so that an aligned series of capsules 2200 can be injected in one operation. Fusible joints 2206 (similar to those shown in FIG. 1) can also be provided for capsule 2200 can separate the train at a suitable depth in the furnace and cause thermally triggered disassembly of capsules as well.

Figure 17:
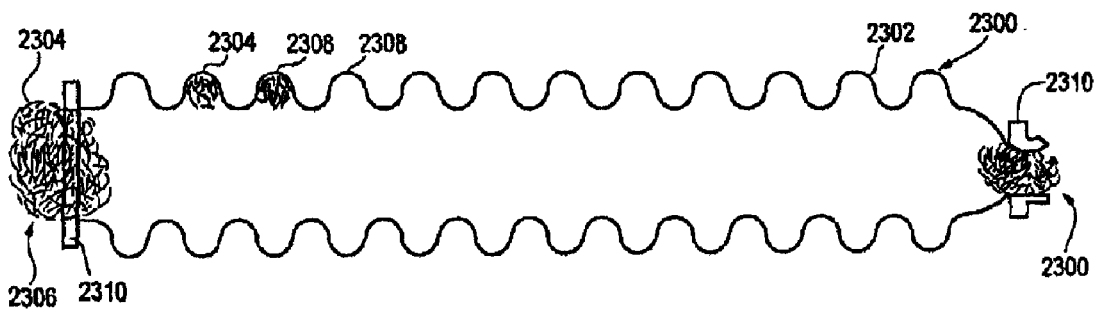
FIG. 17 shows a consumable container made from a corrugated material.

Referring to FIG. 17, illustrates as capsule 2300 design made from corrugated pipe 2302. In one form, capsule 2300 includes metal such as stainless steel wool, (or other wool-like materials), acting as filters 2304 at end-vents 2306. The corrugated pipes ends can be closed using closures 2310, such as end closure clamps (which can be located orthogonal to corrugated pipe 2302). The corrugations lend strength to capsule 2300. As shown, perforations 2308 can be provided in the corrugation grooves as well and these can be used along with gas-permeable filter materials 2304. It is noteworthy that gas pressure produced by heating and reactions in the cargo will inherently tend to enlarge pre-formed (but initially closed) slit perforations in the capsule walls. The structure can include fusable joints designed to define dis-assembly temperatures at various desired depths in the furnace.

Figure 18A:
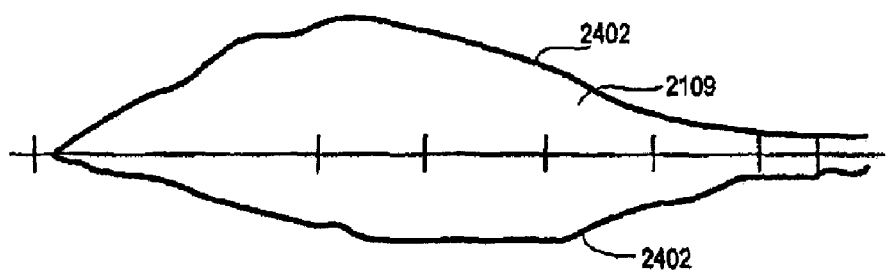
FIG. 18A shows a cross-section of the container of FIG. 18 along the line 18A-18A.

Referring to FIGS. 18 and 18A, there is shown what is believed to be a particularly inexpensive and easy-to-build design for capsule 2400. The wall material is high temperature foil 2402—such as thin sheet steel or iron forming an envelope or a tetrapak. In one form, a sheet of suitable size is simply folded in half, two of the three open edges are stapled, riveted, crimped, spot welded etc or otherwise provided with closures 2407. The open edge is used to load content 2109, such as mixed scale, fluxes, carbon-containing materials etc. as required. The closure process is then completed. In one form, a filtered port 2404 is included and the filter material 2406 can be made from any suitable material like those previously described. Note that gaps 2408 between closure points can also serve as gas vents and inlets.

Magnetic Loaders

Figure 19:
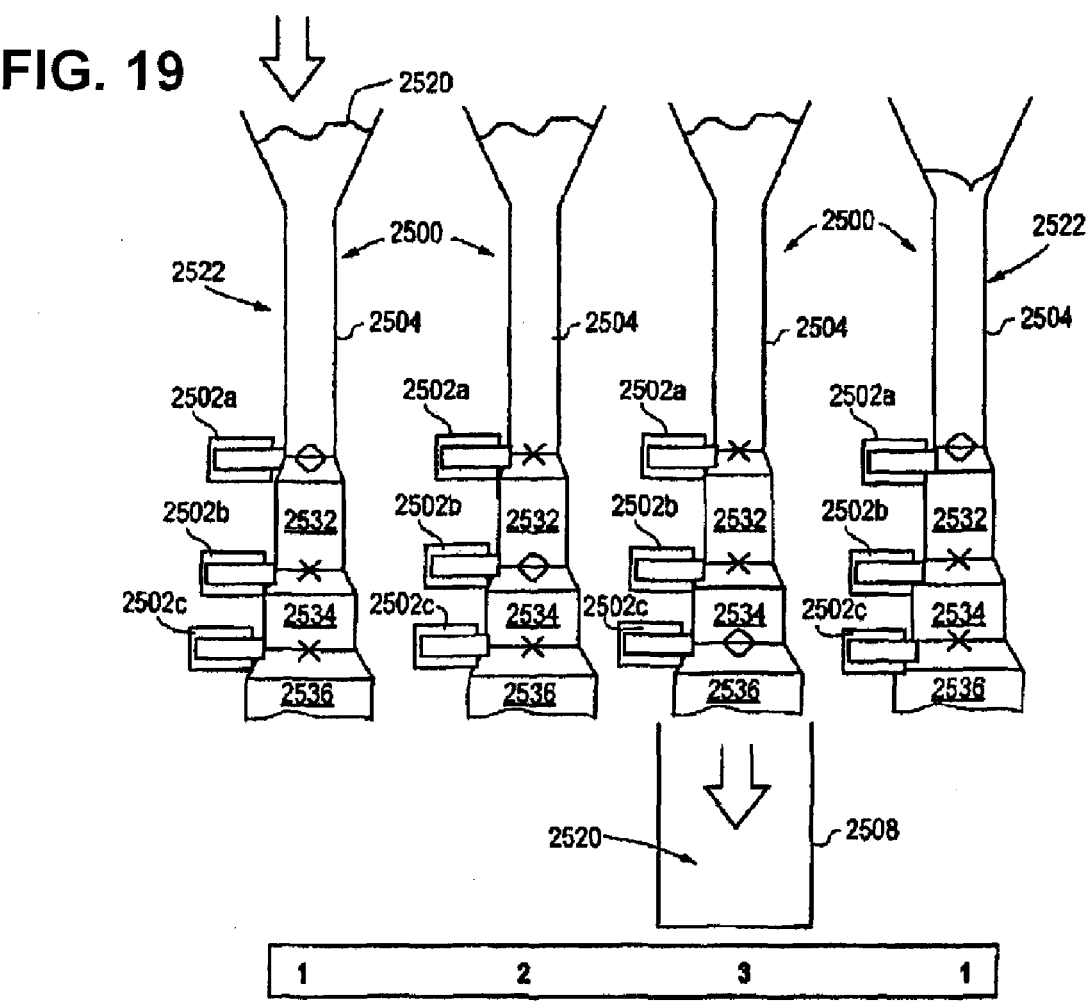
FIG. 19 shows a method of filling a reusable or consumable container using magnets.

While many well-known loading mechanisms are available for loading the capsules, such as those used in the packaged food industry, the ferrous content of capsules opening additional options that have potential advantages such as lack of wear on moving parts etc. Referring to FIG. 19, there is disclosed a gating systems, such as a magnetically-controlled gating system, for metering and loading system 2500 for loading materials 2520, such as mill scale, into capsules 2508. Magnets, such as electromagnets 2502a, 2502b, and 2502c or moveable strong permanent magnets are positioned along the gravity-driven fill tube 2504 as shown. Alternatively, magnetically operated valves can be used for the gating system or other mechanically actuated systems. However, the magnetic gating system is advantageous when used with ferrous materials because it prevents wear from the iron fines on the gating system and prevents the iron fines from jamming up the moving parts. The gating system can use a control mechanism that comprises a system of movable magnets to move the magnetic field closer to or farther away from the rest of the metering and loading system 2500. Where an electromagnet is used, the control mechanism can include controlling the power supplied to the electromagnet through the use of an electrical circuit.

Figure 19A:
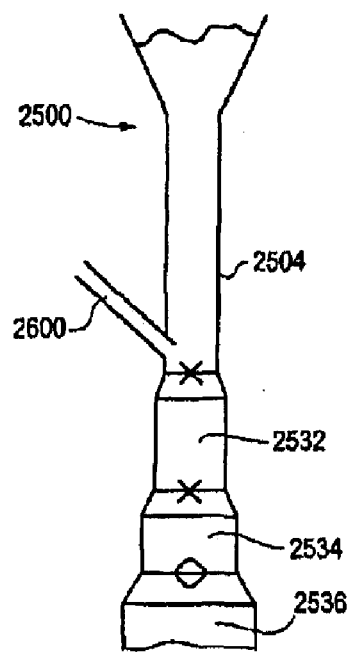
FIG. 19A shows an alternative form of the device shown in FIG. 19.

Electromagnets 2502a, 2502b, and 2502c are energized in the sequence shown (from left to right) to fill capsule 2508 (note that an x denotes a closed gate and an o denotes an open gate in FIG. 19). For example, materials 2520 is contained in reservoir 2522 and the sequence for filling capsule 2508 is shown from left to right. First, magnet 2502a is de-energized to allow materials 2520 to fall within a first compartment 2532, magnet 2402b is energized to prevent the materials 2520 from falling into second compartment 2534, and magnet 2402c is also energized to prevent materials 2520 from falling into loading chute 2536. Second, magnet 2502a is energized to prevent materials 2520 from falling from reservoir 2522 into first compartment 2532, magnet 2505b is de-energized to allow material 2520 to fall into second compartment 2534, and magnet 2505c is energized to prevent material 2520 from falling into loading chute 2536. Third, magnet 2502a is energized to prevent further materials 2520 from falling from reservoir 2522 into first compartment 2532, magnet 2505b is energized to prevent material 2520 from falling into second compartment 2534, and magnet 2505c is de-energized to allow material 2520 to fall into loading chute 2536 and into capsule 2508 beneath the loading chute. Fourth, the process repeats. In an alternate form, permanent magnets can be used and are mechanically moved away to achieve the magnet "off" condition. Since only a small flow impediment is required to stop the downward movement of materials such as mill scale—due to the high internal friction etc. of such granular substances—this technique provides for efficient and simple metering and handling of abrasive materials with no moving parts exposed to wear or jamming. FIG. 19A shows an alternative form that includes a port 2600 through which other materials, such as carbon and/or fluxes or other chemicals can be added to the capsule.

Alternative Methods of Adding Capsules to Furnace Burden

Some alternative methods for introducing the capsules into the blast furnace include a number of top-of-stack injection mechanisms that could include an airlock arrangement to block the escape of hot upstreaming blast furnace gases. Many of the capsules disclosed can be handled using magnetic loader technology because many of the containers can be made of or can include ferromagnetic materials. Additionally, the capsules formed of fabrics will likely contain sufficient quantities of ferromagnetic materials to allow them to be handled in such a manner. Consumable capsules can be made in relatively small or large sizes as has been made clear already. For example, sizes that would have five to twenty pound payloads might be made from thin sheet iron or steel similar to what is used in the food-can industry. Other capsules would require thicker material and could have payloads of hundreds of pounds. In either event it would be possible to generate adequate magnetic forces to handle them.

Analogs of moveable armor that offer minimal impediment to gas flow (i.e. open rails along which dropped capsules can slide could also be used instead of the pneumatic injectors to distribute the capsules on top of the burden. Similarly open gridded guide surfaces could be used to gently slid the capsules onto the fresh blast furnace burden and another method would use hanging buckets/moving cables (mini cable cars) to carry the capsules into the furnace.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A metallurgical process carried out in a blast furnace, the process comprising:
    providing a burden above a liquid iron in a blast furnace, the burden comprising iron, coke and a flux;
    providing an ingredient enclosure;
    placing a first material in the ingredient enclosure, wherein the first material comprises a first ingredient for carrying out a metallurgical process in the blast furnace;
    adding the ingredient enclosure and the first material to the burden;
    heating the burden after the ingredient enclosure and the first material have been added to the furnace;
    opening the ingredient enclosure by the application of heat for a period of time; and
    exposing the first material to the liquid iron.

2. The process of claim 1 wherein the first enclosure comprises a second ingredient for carrying out a metallurgical process in a blast furnace.

3. The process of claim 2 wherein the second ingredient comprises a metal.

4. The process of claim 3 wherein the second ingredient comprises iron.

5. The process of claim 2 wherein the second ingredient comprises a fuel.

6. The process of claim 5 wherein the fuel is a fabric.

7. The process of claim 5 wherein the fuel is a polymer.

8. The process of claim 1 wherein the enclosure includes a vent.

9. The process of claim 8 wherein the first material comprises particulate matter and the enclosure further comprises a filter barrier adapted to prevent the particulate matter from readily escaping through the vent.

10. The process of claim 1 further comprising providing a first portion of the enclosure adapted to fail after exposure to an elevated temperature before the failure of a second portion of the enclosure.

11. The process of claim 10 further comprising opening the enclosure by exposing the first portion of the enclosure to an elevated temperature for a first period of time.

12. The process of claim 11 further comprising exposing the first material to the burden before exposing the first material to the liquid iron.

13. The process of claim 12 wherein opening the enclosure comprises pre-selecting the enclosure so that the enclosure reaches a predetermined depth in the burden when the first material fails.

14. The process of claim 1 further comprising providing a pneumatic injection system and wherein distributing the first set of ingredient enclosures on top of the burden comprises shooting at least a portion of the first set of ingredient enclosures from the pneumatic injection system onto the burden.

15. The process of claim 14 wherein distributing the first set of ingredient enclosures on top of the burden comprises varying the characteristics of a blast of gas through the pneumatic injection system, from one shooting to another.

16. The process of claim 14 wherein the pneumatic injection system includes a movable tube and distributing the first set of ingredient enclosures further comprises aiming the moveable tube by adjusting its elevation and azimuthal angle, determining an appropriate pulse blast of gas, and shooting at least one ingredient enclosure through the aimed moveable tube.

17. A metallurgical process comprising:
    providing an ingredient enclosure;
    placing a plurality of particles of a first material in the ingredient enclosure, wherein the first material contains a first ingredient in a metallurgical process;
    enclosing the plurality of particles of the first material in the ingredient enclosure;
    providing a metallurgical process chamber in which ingredients for the metallurgical process are added;
    adding the ingredient enclosure and the first material to the chamber;
    heating the chamber after the ingredient enclosure and the first material have been added to the chamber;
    opening the enclosure by the application of heat for a period of time; and
    exposing the first material to the chamber.

* * * * *